United States Patent Office
2,876,105
Patented Mar. 3, 1959

2,876,105

DRY LOW-CALORIE SWEETENER COMPOSITION

Pranas Jucaitis and Irene D. Bliudzius, Chicago, Ill., assignors, by mesne assignments, to E. I. du Pont de Nemours and Company, Wilmington, Del.

No Drawing. Application July 19, 1956
Serial No. 598,733

5 Claims. (Cl. 99—141)

This invention is directed to dry, low calorie sweetener compositions which can be used like sugar but which contain a low calorie sweetener extended with a Polyose.

Bulk extenders which can be used with non-nutritive sweeteners are relatively few in number and many of the things which have heretofore been used have serious disadvantages. Some, like pectin, are nutritive and the use of any large amount of them defeats the purposes of using a non-nutritive sweetener. Others such as gum arabic and gum tragacanth are not rapidly soluble. Other extenders yield turbid solutions or solutions of too high a viscosity. Still others are laxatives and cannot for this reason be used in any large amount. There is therefore a great problem in extending the volume of a non-nutritive sweetener to a bulk comparable, on a sweetness basis, to that of sugar.

This invention relates to dry, low calorie sweetener compositions which contain non-nutritive sweeteners and which have a volume, based upon sweetness, comparable to that of sugar. This permits one to add the non-nutritive sweetener to tea, to coffee, or to other foods by measuring with a teaspoon or in other accustomed fashion and to obtain a sweetness level which one is accustomed to obtain with sugar when it is added in the same fashion. Even with somewhat less bulk with a given amount of sweetness, one can easily learn to measure a desired sweetness. This makes non-nutritive sweeteners much more easily and more pleasantly usable than when employed as concentrated syrups or tablets.

The sweetener compositions of the invention include a low calorie sweetener such as a cyclamate and saccharin. The cyclamate can be any of the salts of N-cyclohexylsulfamic acid or the acid itself as described in Audrieth Patent 2,275,125. Of the salts it is preferred to use an alkali salt such as calcium, sodium, potassium, and ammonium, cyclamate and the like.

Mixtures of the sweetening agent can also be used. Thus there can be used mixtures of cyclamate with saccharin or with saccharin and sorbitol as described in the Gordon Patents 2,629,665 and 2,653,105.

In compositions of the invention sodium cyclamate, calcium cyclamate, or another soluble cyclamate should be used in an amount from about 50 to 300 milligrams for each 5 milliliters of product. More narrowly it is preferred to use from about 100 to 200 milligrams for each 5 milliliters of product. If it is desired to produce a product of considerable bulk but which is much sweeter than sugar, then up to 500 milligrams, or even more, per 5 milliliters of product can be used.

This can be expressed as follows:

Weight percent cyclamate=

(1) $\dfrac{1}{\text{Bulk density}}$ to (2) $\dfrac{6}{\text{Bulk density}}$ in which bulk density is expressed as grams per milliliter. The cyclamate content can be even greater, as noted above.

More preferred is an amount of cyclamate within the range which can be expressed:

Weight percent cyclamate=

(3) $\dfrac{2}{\text{Bulk density}}$ to (4) $\dfrac{4}{\text{Bulk density}}$

In the foregoing, mixtures of cyclamate and saccharin can be substituted for the cyclamate, bearing in mind the fact that saccharin is about ten times as sweet as cyclamate. Thus if a part of the cyclamate is replaced by saccharin, the weight of saccharin would be one-tenth that of the cyclamate replaced. If all is replaced, then about one-tenth the weight of saccharin will be needed. This can be expressed by saying that:

(5) Weight percent of cyclamate plus ten times the weight percent of saccharin equals the ranges set out in Formulas 1, 2, 3, and 4 above.

More broadly the expression, 5, can go up to, or even above:

(6) $\dfrac{10}{\text{Bulk density}}$

One preferred mixture of sweetening agents is one in which an alkali cyclamate such as sodium or calcium cyclamate is used with saccharin in a cyclamate:saccharin weight ratio of 1:10.

The use of still other proportions of the low calorie sweeteners can be used as set out in the Gordon patents previously mentioned and in each instance the quantities to be used will be comparable, on a sweetness basis, to the mixture shown above.

The dry, low calorie sweetener compositions of the invention contain in addition to the sweetener a considerable amount of a Polyose.

A Polyose is a glucose polymer derived from starch from depolymerization followed by heat polymerization as described in detail in the Durand Patent 2,563,014. The Polyoses are sold by the Corn Products Refining Company. The Polyoses have a considerably different susceptibility to amylolytic enzymes than the original starch or its conventional degradation products. The products on test contain groups which act like very small amounts of reducing sugar, not in excess of about 5 to 7 percent in Polyose A. The reducing sugar is not construed as due to the presence of free glucose.

A preferred Polyose for purposes of the invention is Polyose A which can be described as a glucose polymer derived from starch by depolymerization followed by heat polymerization to such an extent that at 67 percent solids it gives a viscosity (Brookfield) of 20–100 poises at 70° F. More viscous Polyoses can be used. Polyose B requires only 60 percent, and Polyose C requires only 50 percent, and Polyose D requires only 40 percent of solids to give the viscosity described. Polyose B is as good as A and can be used in the same amounts.

The weight of a Polyose in a composition of the invention can range from the balance of the composition after considering the sweetener content to some smaller figure. Not less than about 20 percent by weight of Polyose would ordinarily be used. It is preferred that the Polyose be used in an amount of at least 40 percent by weight of the composition.

The preferred compositions of the invention can also contain up to 30 percent by weight of gum arabic. The gum arabic acts to make the Polyose somewhat heavier so that it does not float upon the surface of a liquid. The gum arabic and the Polyose both become more soluble in the presence of each other.

The structure of particles of a sweetening composition containing a Polyose is strengthened by the inclusion of a water soluble cellulose derivative such as hydroxyethylcellulose. Hydroxyethylcellulose can be included in amounts up to about 20% by weight.

Instead of the gum arabic there can be used equivalent amounts of other gums such as cold water soluble carragheen, guar gum, gum acacia, gum tragacanths, gum ghatti, hydrolyzed collagen, and degraded gelatin. Some of the last named have nutritive value and too much should not be used. Similarly there can be used gelatin itself or soy bean protein.

As agents for strengthening the particles of the composition there can also be used polyvinyl pyrrolidone, cold water soluble polyvinyl alcohol, and dextran.

With sodium or potassium cyclamate there can be used materials which would cause a precipitate or which would combine with the calcium or magnesium of calcium and magnesium cyclamates. Thus there can be used sodium carboxy methylcellulose, pectin, and sodium, potassium, and ammonium alginate.

The Polyose has a tendency to float on the surface of a liquid and a surface active agent can be included in the composition to minimize this tendency. There can be used lecithin, and polyoxyethylenes sorbitan monooleate. Thus there can be used "tween" 80 which is a polyoxyethylene sorbitan mono-oleate with 20 moles of ethyleneoxide for each of sorbitan or "tween" 81 which has 4 moles of ethyleneoxide. There can similarly be used "tween" 60 which is similar to "tween" 80 but is the monostearate. Many food-grade surface active agents are well know and can be used in amounts already common in the art.

Inorganic materials can be added such as sodium or potassium hexametaphosphate or tripolyphosphate. These have a tendency to prevent the flocculation of calcium and to broaden the range of materials which can be used with calcium or magnesium cyclamate.

Traces of sodium chloride, calcium chloride or other materials used for saltines can be added to enhance the flavor of a sweetening composition of the invention. Sodium or potassium bicarbonate can also be added in moderate amounts and if used with the calcium cyclamate there should also be used a small amount of the same alkali metal salt of hexametaphosphate to prevent precipitation of the calcium or magnesium.

Compositions of the invention can include additives such as those shown in the Gordon patents and in Brenner 2,691,591.

In order that the invention may be better understood, reference should be had to the following illustrative examples.

*Example 1*

A sweetening composition having a volume comparable to that of sugar on a sweetness basis was made with the following components in parts by weight as shown:

| | |
|---|---|
| Calcium cyclamate | 40 |
| Polyose A | 80 |
| Gum arabic | 60 |
| Hydroxyethylcellulose | 20 |
| Water | 100 |

The dry ingredients were first mixed and added to a Waring Blendor. The water was added at 70° C. and mixed for 5 minutes in the Waring Blendor at high speed. The mixture formed a foam which was spread on heavy duty aluminum foil and dried for two hours at 55° C. After drying, the material was stripped from the aluminum. The product had a bulk density of 0.24 to 0.25 gram per milliliter. It was readily soluble in hot water. The granules did not float in the liquid and there was no objectionable cloudiness.

Instead of drying as above the mixture can be sprayed dried or drum dried at atmospheric pressure or in a vacuum. The solution can be whipped or not.

A similar composition can be prepared using 20 parts by weight of calcium cyclamate but otherwise using the same ingredients. This has a lower sweetness level. A similar composition with 160 parts by weight of calcium cyclamate can similarly be made. This has a smaller volume than sugar on a sweetness basis.

Sodium cyclamate can be used at the rate of 40 parts by weight, or 20 to 160 parts by weight as described above to obtain comparable sweetening compositions.

A sweetening composition can be made as above with 20 parts by weight of calcium cyclamate or sodium cyclamate with 2 parts by weight of saccharin to obtain compositions comparable in sweetness to the one first shown. Sorbitol can also be used to modify taste in the sweetening agent in the composition.

*Example 2*

A sweetening composition was made with the following components in the amount shown by weight:

| | |
|---|---|
| Calcium cyclamate | 4 |
| Polyose A | 4 |
| Gum arabic | 10 |

The calcium cyclamate used in this mixture was a recrystallized product made by dissolving 3.2 grams of calcium cyclamate in 100 milliliters of boiling 95% ethanol. Upon cooling and air drying, crystals having a bulk density of 0.03 gram per milliliter were obtained.

The dry ingredients were mixed and while being mixed were sprayed with 95% ethanol. Enough ethanol was used to cause an incipient dissolving of the particles.

The product was dried in an oven at 105° C.

The product does not float on water. It dissolves readily in hot water and forms a colorless solution.

Again, sodium cyclamate or a mixture of cyclamate with saccharin or sorbitol can be used in equivalent amount in the above composition.

*Example 3*

A sweetening composition was made with the following components in the parts indicated by weight:

| | |
|---|---|
| Calcium cyclamate | 20 |
| Polyose A | 80 |

This composition can be used as a dry mixture.

It can be sprayed with enough of an isopropanol solution of polyvinyl pyrrolidone to effect strengthening and slight moistening. This yields a product of somewhat stronger and more uniform structure.

Instead of using calcium cyclamate as shown, there can be used sodium cyclamate or a mixture of sodium or calcium cyclamate with saccharin which additionally may or may not contain sorbitol.

We claim:

1. A dry, low calorie sweetener composition containing at least 20 percent by weight of a glucose polymer derived from starch by depolymerization followed by heat polymerization to such an extent that 67 percent solids give a viscosity of 20 to 100 poises at 70° F., the composition also containing up to 30 percent by weight of a gum, up to 20 percent by weight of a water soluble cellulose derivative, a small amount of a surface active agent, and an alkali cyclamate, the weight percent alkali cyclamate equals:

$$\frac{1}{\text{Bulk density}} \text{ to } \frac{6}{\text{Bulk density}}$$

2. A dry, low calorie sweetener composition containing at least 20 percent by weight of a glucose polymer derived from starch by depolymerization followed by heat polymerization to such an extent that 67 percent solids give a viscosity of 20 to 100 poises at 70° F., the composition also containing up to 30 percent by weight of a gum, up to 20 percent by weight of hydroxyethylcellulose, a small amount of a surface active agent, and an alkali cyclamate, the weight percent alkali cyclamate equals:

$$\frac{2}{\text{Bulk density}}$$

to $$\frac{4}{\text{Bulk density}}$$

3. A dry, low calorie sweetener composition containing at least 20 percent by weight of a glucose polymer derived from starch by depolymerization followed by heat polymerization to such an extent that 67 percent solids give a viscosity of 20 to 100 poises at 70° F., the composition also containing up to 30 percent by weight of a gum, up to 20 percent by weight of a water soluble cellulose derivative, a small amount of a surface active agent, and an alkali cyclamate:saccharin mixture in the following amount:

Weight percent cyclamate + 10 ×

$$\text{weight percent saccharin} = \frac{10}{\text{bulk density}}$$

4. A dry, low-calorie sweetener composition containing at least 20% by weight of a glucose polymer derived from starch by depolymerization followed by heat polymerization to such an extent that between 40 and 67% solids give a viscosity of 20 to 100 poises at 70° F., and at least one sweetener selected from the group consisting of saccharin and cyclamate, such sweetener being present in the composition in the following amounts:

$$\frac{10}{\text{Bulk density}}$$

5. A dry, low-calorie sweetener composition containing at least 20% by weight of a glucose polymer derived from starch by depolymerization followed by heat polymerization to such an extent that between 40 and 67% solids give a viscosity of 20 to 100 poises at 70° F., and one or more sweeteners selected from the class consisting of cyclamates and saccharin.

References Cited in the file of this patent

UNITED STATES PATENTS

| | | |
|---|---|---|
| 1,801,053 | Meigs | Apr. 14, 1931 |
| 2,305,168 | Langlois | Dec. 15, 1942 |
| 2,563,014 | Durand | Aug. 7, 1951 |
| 2,629,665 | Gordon | Feb. 24, 1953 |
| 2,653,105 | Gordon | Sept. 22, 1953 |